United States Patent
Kim et al.

(10) Patent No.: US 12,156,215 B2
(45) Date of Patent: Nov. 26, 2024

(54) METHOD BY WHICH TERMINAL REALLOCATES TRANSMISSION RESOURCES BY CONSIDERING TRANSMISSION RESOURCES BETWEEN TRAVELING GROUPS IN WIRELESS COMMUNICATION SYSTEM THAT SUPPORTS SIDELINK, AND APPARATUS THEREFOR

(71) Applicant: LG Electronics Inc., Seoul (KR)

(72) Inventors: Youngdae Kim, Seoul (KR); Hyunmin Kim, Seoul (KR); Byounggill Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 17/779,057

(22) PCT Filed: Dec. 16, 2019

(86) PCT No.: PCT/KR2019/017774
§ 371 (c)(1),
(2) Date: May 23, 2022

(87) PCT Pub. No.: WO2021/125365
PCT Pub. Date: Jun. 24, 2021

(65) Prior Publication Data
US 2023/0107971 A1    Apr. 6, 2023

(51) Int. Cl.
*H04W 4/00* (2018.01)
*H04L 5/00* (2006.01)
(Continued)

(52) U.S. Cl.
CPC ........... *H04W 72/20* (2023.01); *H04L 5/0096* (2013.01); *H04W 4/023* (2013.01); *H04W 4/46* (2018.02); *H04W 72/121* (2013.01)

(58) Field of Classification Search
CPC ....... H04W 72/20; H04W 4/023; H04W 4/46; H04W 72/121; H04W 72/25;
(Continued)

(56) References Cited

U.S. PATENT DOCUMENTS 12,004,122 B2 *   6/2024  Lee ..................... H04W 72/20
2018/0279275 A1 * 9/2018  Chen .................... H04W 72/23
(Continued)

FOREIGN PATENT DOCUMENTS

KR      20160140756       12/2016
WO      WO-2018062966 A1 * 4/2018 ........... H04B 7/0695
(Continued)

OTHER PUBLICATIONS

Beijing University of Post and Telecommunication, "Discussion on mode-2 resource allocation mechanism," R1-1912422, Presented at 3GPP TSG RAN WG1 Meeting #99, Reno, Nevada, Nov. 18-22, 2019, 4 pages.
(Continued)

*Primary Examiner* — Thai D Hoang
(74) *Attorney, Agent, or Firm* — Fish & Richardson P.C.

(57) ABSTRACT

Disclosed, according to various embodiments, is a method by which a first terminal included in a first traveling group grouped on the basis of a traveling lane reallocates transmission resources on the basis of traveling group information in a wireless communication system that supports a sidelink. Disclosed are a method and an apparatus therefor, the method comprising the steps of: transmitting a signal in a first resource domain to a second terminal included in the first traveling group; receiving group information from a second traveling group in a lane different from that of the first traveling group; determining whether to reallocate the first resource domain, on the basis of the group information including traveling lane information of the second traveling
(Continued)

group and information about a second resource domain to be used for signal transmission/reception with a third traveling group that is another traveling group; and transmitting the group information to the second terminal.

14 Claims, 24 Drawing Sheets

(51) Int. Cl.
  *H04W 4/02* (2018.01)
  *H04W 4/46* (2018.01)
  *H04W 72/121* (2023.01)
  *H04W 72/20* (2023.01)

(58) Field of Classification Search
  CPC ....... H04W 72/40; H04W 4/70; H04W 72/02; H04W 92/18; H04W 4/08; H04W 4/40; H04W 72/51; H04L 5/0096; H04L 5/0055; H04L 5/0037; H04L 5/0053; H04L 5/0094; Y02D 30/70
  See application file for complete search history.

(56) References Cited

U.S. PATENT DOCUMENTS

2019/0174286 A1  6/2019  Guo et al.
2019/0239264 A1  8/2019  Hahn

FOREIGN PATENT DOCUMENTS

| WO | WO-2019031926 A1 * | 2/2019 | ........... H04B 17/318 |
| WO | WO-2021030561 A1 * | 2/2021 | ........... H04L 1/1812 |

OTHER PUBLICATIONS

International Search Report and Written Opinion in International Appln. No. PCT/KR2019/017774, dated Sep. 11, 2020, 8 pages (with English translation).

ITRI, "Remaining Issues on NR Sidelink Resource Allocation Mechanism for Mode 2," R1-1912582, Presented at 3GPP TSG RAN WG1 #99, Reno, USA, Nov. 18-22, 2019, 9 pages.

* cited by examiner (a)

(b)

(a)

(b)

(a)

(b)

(a)

(b)

(a)

(b)

(a)

(b)

(c)

METHOD BY WHICH TERMINAL REALLOCATES TRANSMISSION RESOURCES BY CONSIDERING TRANSMISSION RESOURCES BETWEEN TRAVELING GROUPS IN WIRELESS COMMUNICATION SYSTEM THAT SUPPORTS SIDELINK, AND APPARATUS THEREFOR

CROSS-REFERENCE TO RELATED APPLICATIONS

This application is a National Stage application under 35 U.S.C. § 371 of International Application No. PCT/KR2019/017774, filed on Dec. 16, 2019, the disclosure of which is incorporated by reference in its entirety.

TECHNICAL FIELD

The present disclosure relates to a method of reallocating, by a first user equipment (UE) included in a first driving group grouped based on driving lanes, transmission resources based on driving groups in a wireless communication system supporting sidelink and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method of reallocating transmission resources based on driving group information to minimize or prevent interference to signal transmission of a user equipment (UE), which is caused by signal transmission and reception between driving groups.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of reallocating, by a first user equipment (UE) included in a first driving group grouped based on driving lanes, transmission resources based on driving group information in a wireless communication system supporting sidelink. The method may include: transmitting, to a second UE included in the first driving group, a signal in a first resource region; receiving group information from a second driving group on a different lane from the first driving group; determining whether to reallocate the first resource region based on the group information comprising information on the driving lane of the second driving group and information on a second resource region used for signal transmission and reception with a third driving group, which is another driving group; and transmitting the group information to the second UE.

Alternatively, the group information may be additionally transmitted to another UE in the first driving group on an acknowledgment/negative acknowledgment (ACK/NACK) channel related to a signal received from the other UE.

Alternatively, the group information may further include information on a resource region for the second driving group to transmit and receive a signal to and from the first driving group.

Alternatively, resource reallocation of the first resource region may be triggered only when a lane of the first driving group is located between the lane of the second driving group and a lane of the third driving group.

Alternatively, the first UE may be configured to determine a time to perform reallocation of the first resource region based on information on speeds and distances of the second driving group and the third driving group obtained from a sensor.

Alternatively, a height of a beam formed between the second driving group and the third driving group may be estimated based on type information.

Alternatively, the estimated beam height and a height of a vehicle including the first UE may be additionally considered to determine whether to reallocate the first resource region.

Alternatively, the first UE may be configured to determine whether to relay a signal between the second driving group and the third driving group based on the estimated beam height and the height of the vehicle including the first UE.

In another aspect of the present disclosure, there is provided a first UE including a radio frequency (RF) transceiver; and a processor connected to the RF transceiver. The processor may be configured to: control the RF transceiver to transmit, to a second UE included in the first driving group, a signal in a first resource region; control the RF transceiver to receive group information from a second driving group on a different lane from the first driving group; determine whether to reallocate the first resource region based on the group information comprising information on the driving lane of the second driving group and information on a second resource region used for signal transmission and reception with a third driving group, which is another driving group; and control the RF transceiver to transmit the group information to the second UE.

Alternatively, the group information may be additionally transmitted to another UE in the first driving group on an ACK/NACK channel related to a signal received from the other UE.

Alternatively, whether to reallocate the first resource region may be determined based on a positional relationship between the second driving group and the third driving group and based on whether the first resource region overlaps with the second resource region.

Advantageous Effects

According to various embodiments, a user equipment (UE) may minimize or prevent interference to signal transmission of the UE, which is caused by signal transmission and reception between driving groups, by reallocating transmission resources based on driving group information.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIGS. 19 and 20 are views for explaining a method in which a UE belonging to a driving group performs resource reallocation based on information acquired by a sensor or the like;

BEST MODE

Figure 1:
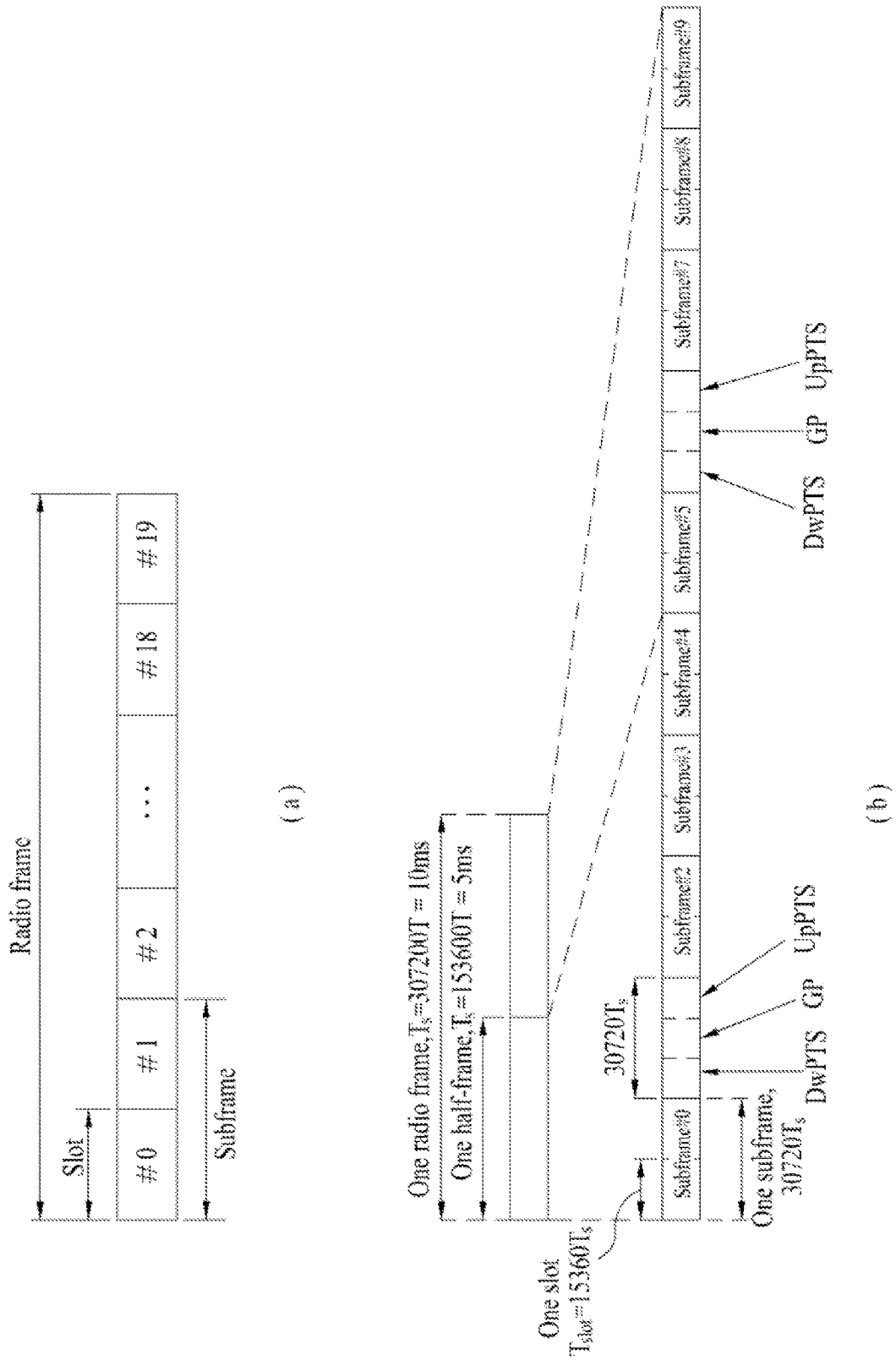
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency-division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
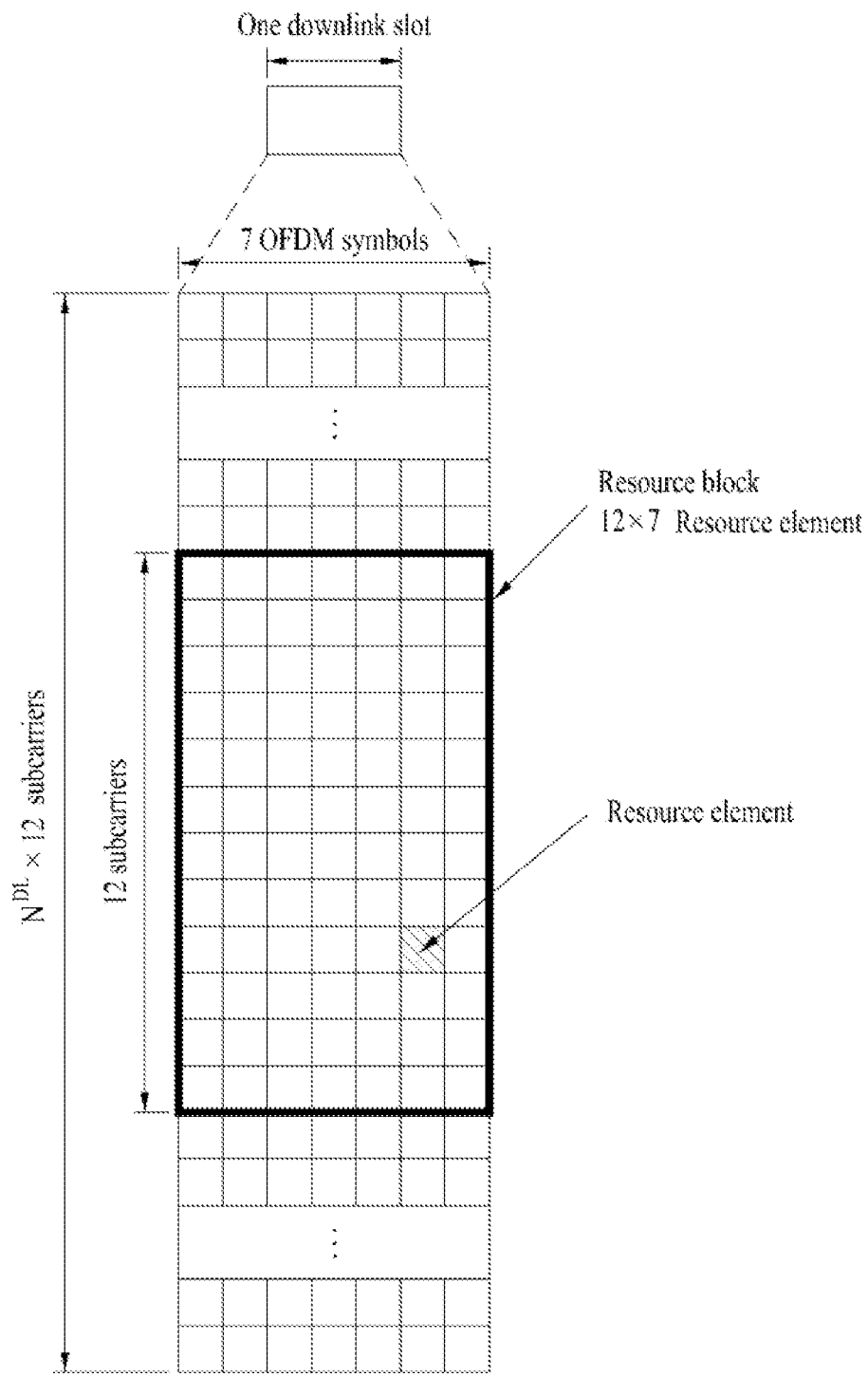
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
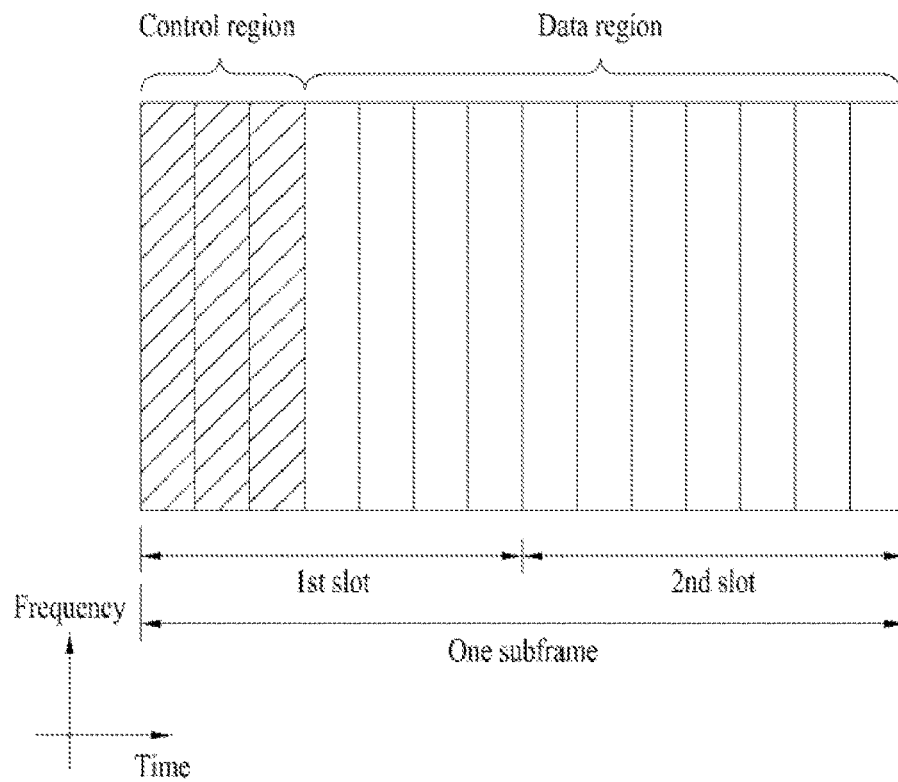
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VOIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
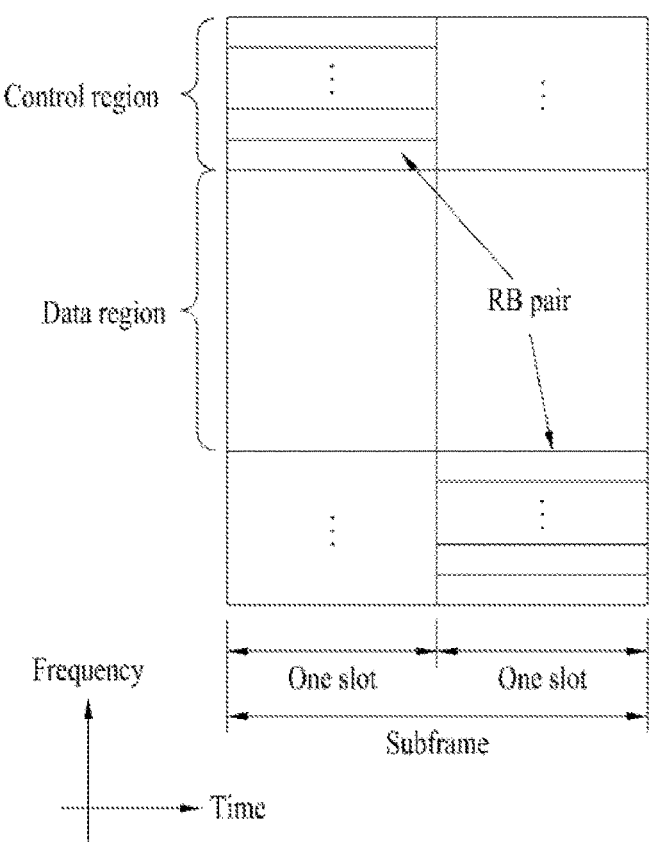
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
i) Demodulation-reference signal (DM-RS) used for channel estimation for coherent demodulation of information delivered on a PUSCH and a PUCCH; and
ii) Sounding reference signal (SRS) used for an eNB or a network to measure the quality of an uplink channel in a different frequency.

The downlink RSs are categorized into:
i) Cell-specific reference signal (CRS) shared among all UEs of a cell;
ii) UE-specific RS dedicated to a specific UE;
iii) DM-RS used for coherent demodulation of a PDSCH, when the PDSCH is transmitted;
iv) Channel state information-reference signal (CSI-RS) carrying CSI, when downlink DM-RSs are transmitted;
v) Multimedia broadcast single frequency network (MBSFN) RS used for coherent demodulation of a signal transmitted in MBSFN mode; and
vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Multiple-Input and Multiple-Output (MIMO) System Modeling

Figure 5:
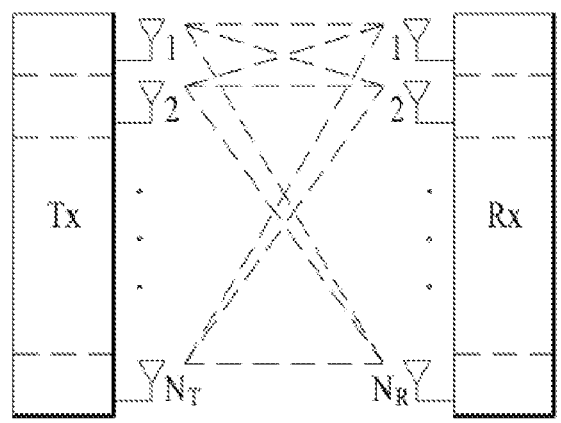
FIG. 5 is a view illustrating the configuration of a wireless communication system having multiple antennas.
Figure 5:
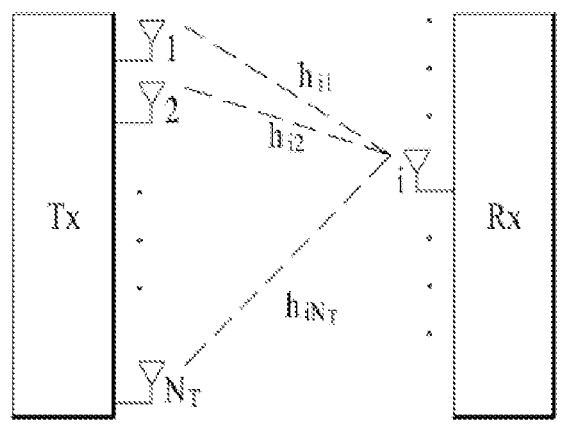

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix.

In FIG. 5(b), the channels from the $N_T$ Tx antennas to the Rx antenna i can be expressed as follows.

$$h_i^T = [h_{i1}, h_{i2}, \ldots, h_{iN_T}] \qquad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Hereinafter, a description will be given of synchronization acquisition between UEs in D2D communication based on the above description and the legacy LTE/LTE-A system. In an OFDM system, if time/frequency synchronization is not matched, multiplexing may be impossible between different UEs in an OFDM signal due to inter-cell interference. In addition, it is inefficient that D2D UEs directly transmit and receive synchronization signals to achieve synchronization and all UEs individually obtain synchronization. Accordingly, in a distributed node system such as D2D, a specific node may transmit a representative synchronization signal, and others UEs may obtain synchronization based on the representative synchronization signal. In other words, some nodes may transmit a D2D synchronization signal (D2DSS) for D2D signal transmission and reception (such a node may be referred to as an eNB, a UE, a synchronization reference node (SRN), or a synchronization source), and other UEs may transmit and receive signals in synchronization with the D2DSS.

Figure 6:
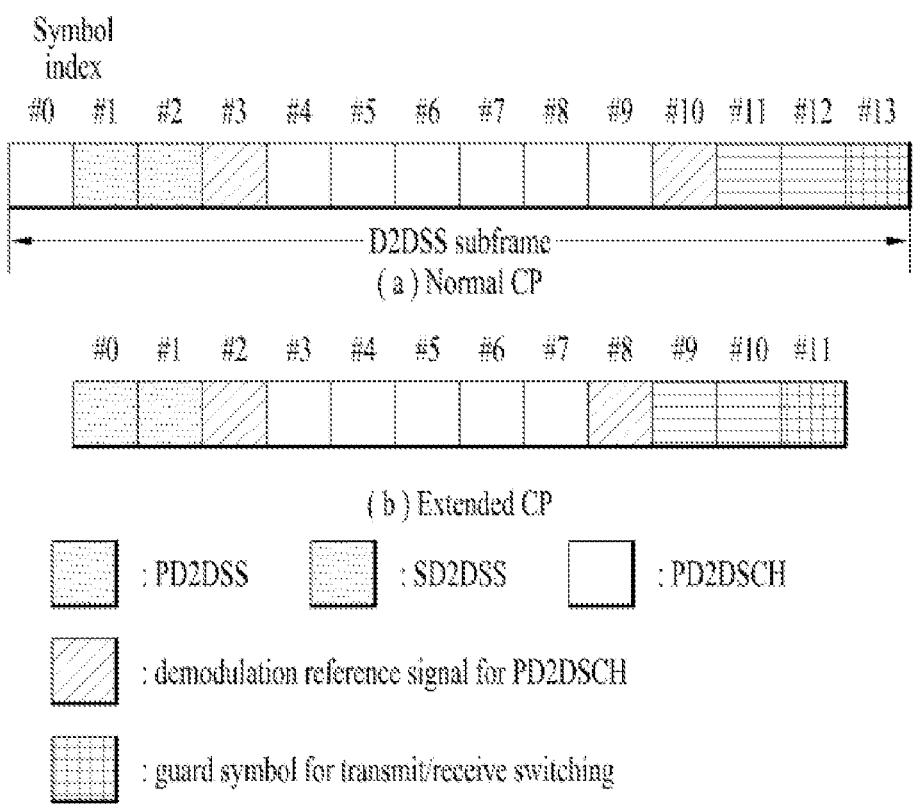
FIG. 6 is a view illustrating a subframe carrying a device-to-device (D2D) synchronization signal.

The D2DSS may include a primary synchronization signal (PSS) (e.g., primary D2DSS (PD2DSS) or primary sidelink synchronization signal (PSSS)) and a secondary synchronization signal (SSS) (e.g., secondary D2DSS (SD2DSS) or secondary sidelink synchronization signal (SSSS)). The PD2DSS may be a Zadoff-Chu sequence with a predetermined length or have a similar/modified/repeated structure of the PSS. The PD2DSS may use a different Zadoff-Chu root index (e.g., 26, 37) from that of a DL PSS. The SD2DSS may be an M-sequence or have a similar/modified/repeated structure of the SSS. If UEs synchronize with an eNB, the eNB serves as the SRN, and the D2DSS becomes the PSS/SSS. Unlike a DL PSS/SSS, the PD2DSS/SD2DSS follows UL subcarrier mapping. FIG. 6 illustrates a subframe in which a D2DSS is transmitted. A physical D2D synchronization channel (PD2DSCH) may be a (broadcast) channel carrying basic (system) information that the UE needs to know first before transmission and reception of a D2D signal (for example, the basic (system) information may include D2DSS related information, duplex mode (DM), TDD UL/DL configurations, resource pool related information, D2DSS related application types, subframe offsets, broadcast information, etc.). The PD2DSCH may be transmitted in the same subframe as the D2DSS or in a subsequent subframe. A DMRS may be used for demodulation of the PD2DSCH.

The SRN may be a node that transmits the D2DSS or PD2DSCH. The D2DSS may be in the form of a specific sequence, and the PD2DSCH may be in the form of a sequence indicating specific information or a code word obtained by predetermined channel coding. Here, the SRN may be an eNB or a specific D2D UE. In the case of partial network coverage or out of network coverage, the SRN may be a UE.

Figure 7:
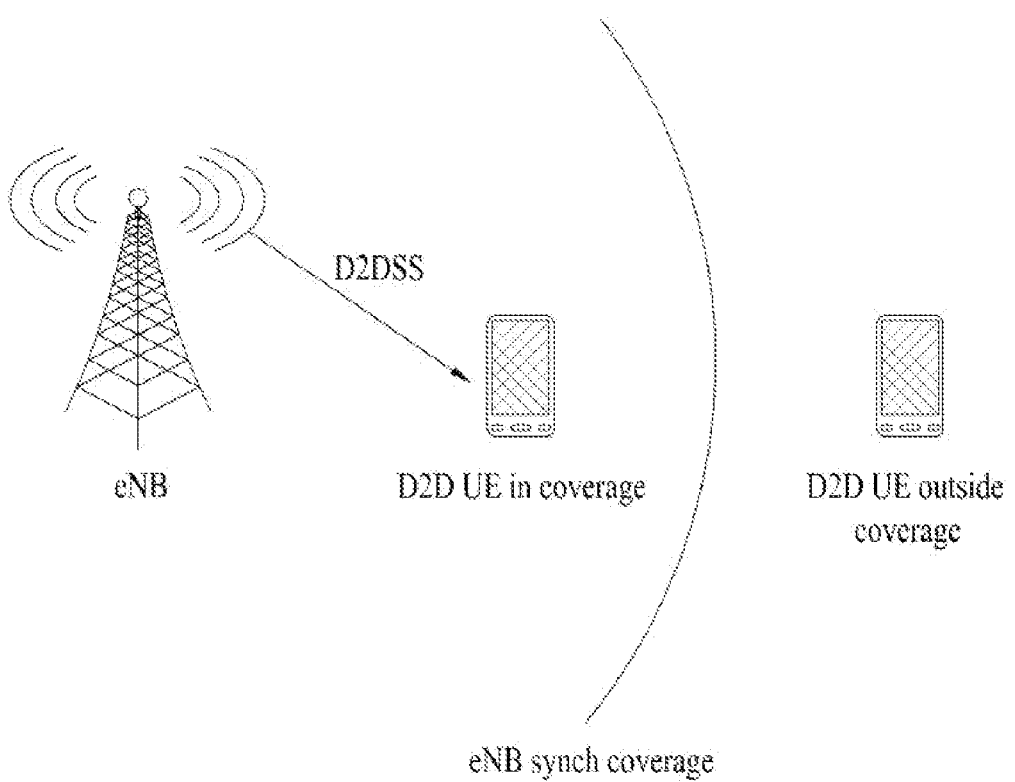
FIG. 7 is a view illustrating relay of a D2D signal.

In the situation shown in FIG. 7, the D2DSS may be relayed for D2D communication with an out-of-coverage UE. The D2DSS may be relayed over multiple hops. In the following description, relaying a synchronization signal may mean transmission of a D2DSS with a separate format based on a synchronization signal reception time as well as direct amplify-and-forward (AF) relay of a synchronization signal transmitted from a BS. As described above, if a D2DSS is relayed, an in-coverage UE may communicate directly with an out-of-coverage UE.

D2D Resource Pool

Figure 8:
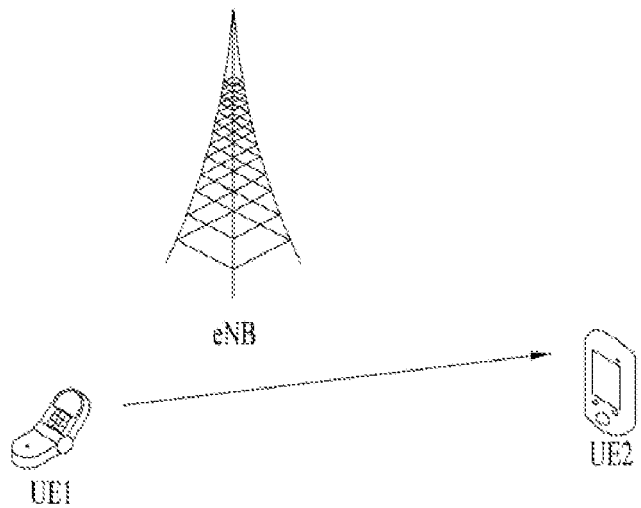
FIG. 8 is a view illustrating an exemplary D2D resource pool for D2D communication.
Figure 8:
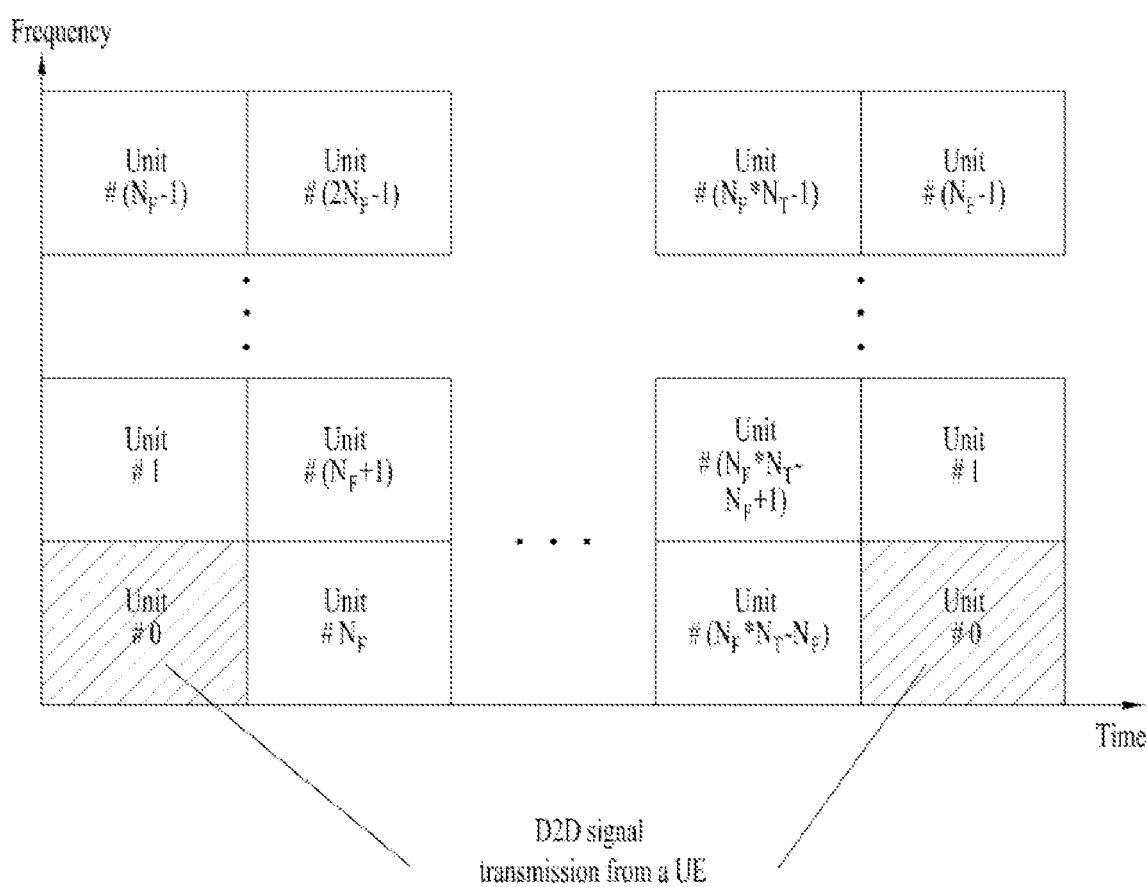

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
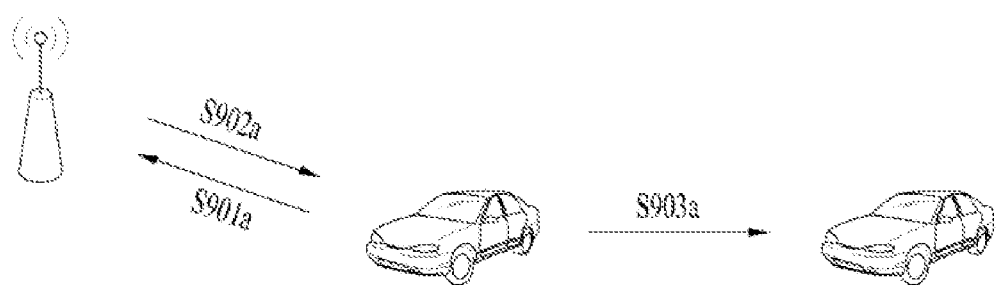
FIG. 9 is a view for explaining transmission modes and scheduling schemes for vehicle-to-everything (V2X)
Figure 9:
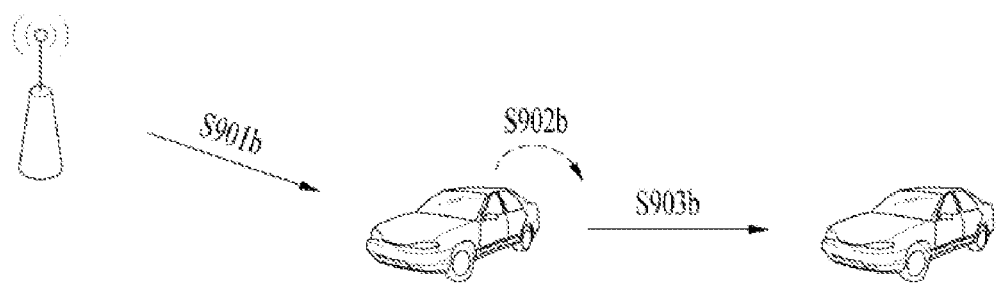
Figure 10:
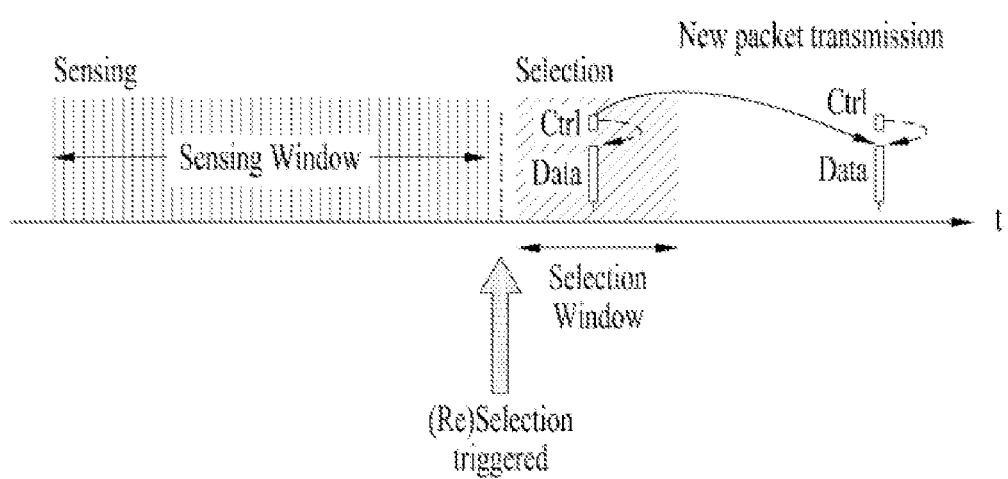
FIG. 10 is a view illustrating a method of selecting resources in V2X.
Figure 11:
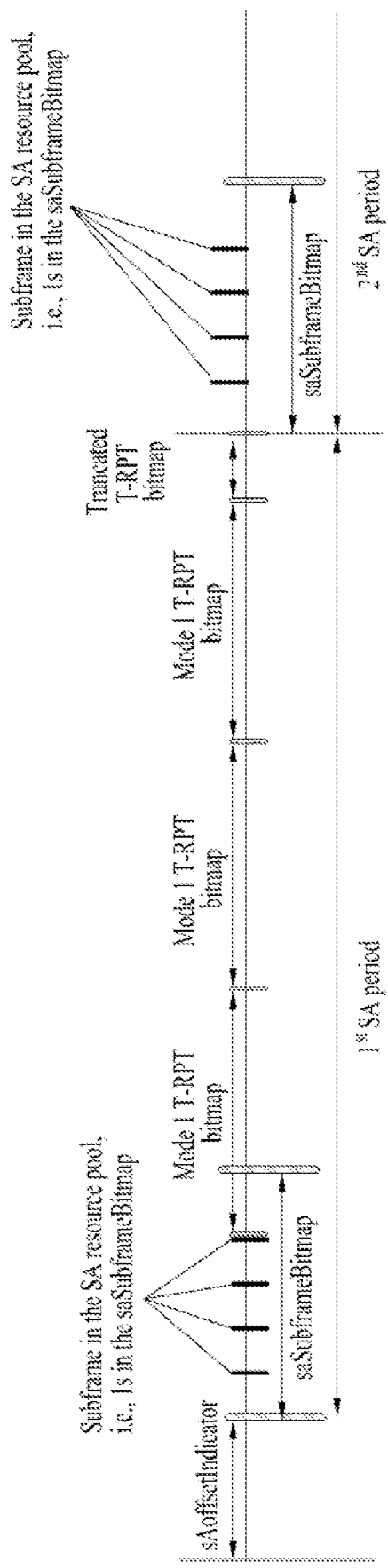
FIG. 11 is a view for explaining a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1s in a T-RPT bitmap, and one MAC PDU is transmitted four times.

Figure 12:
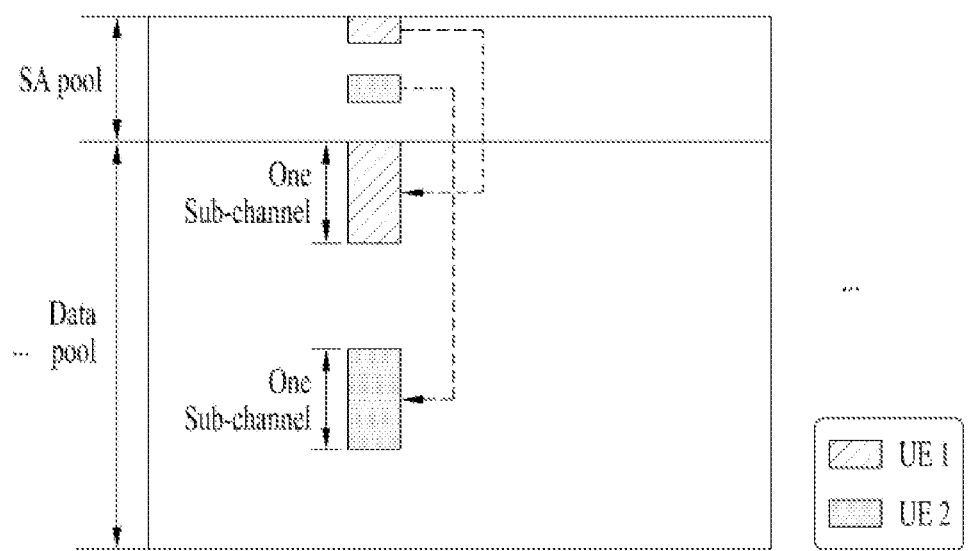
FIG. 12 is a view for explaining an SA and data transmission in V2X.
Figure 12:
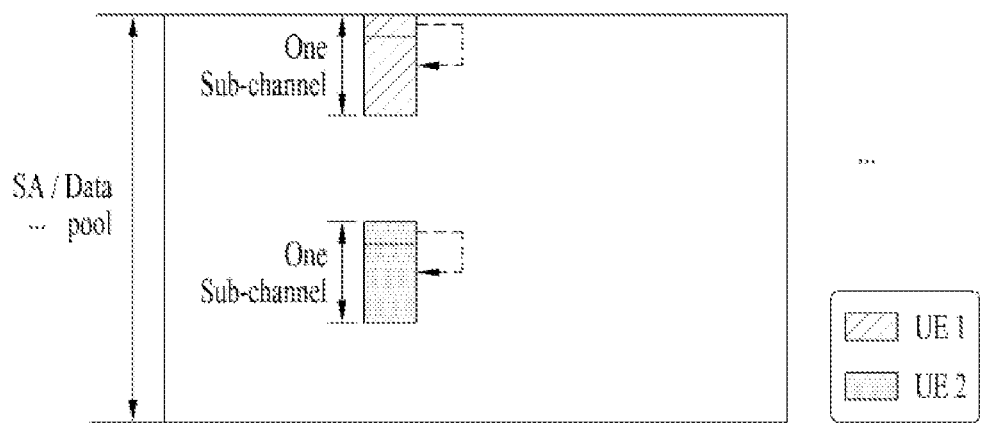

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
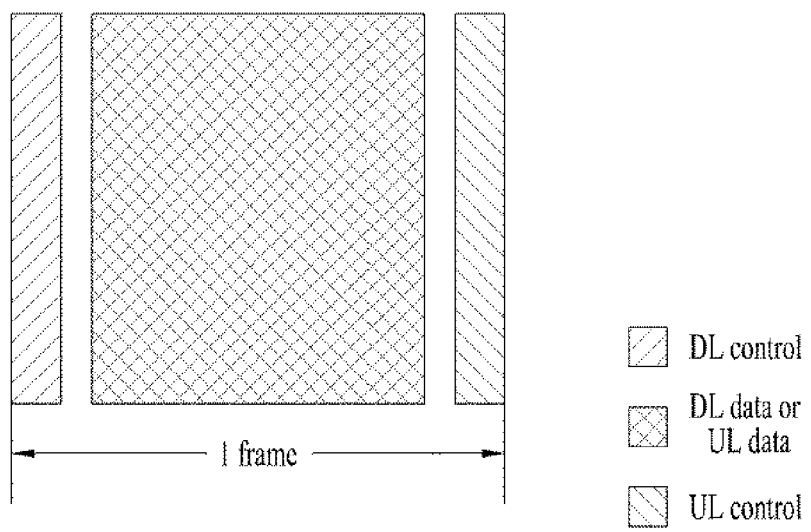
FIGS. 13 and 14 are views illustrating a new radio access technology (NRAT) frame structure.
Figure 14:
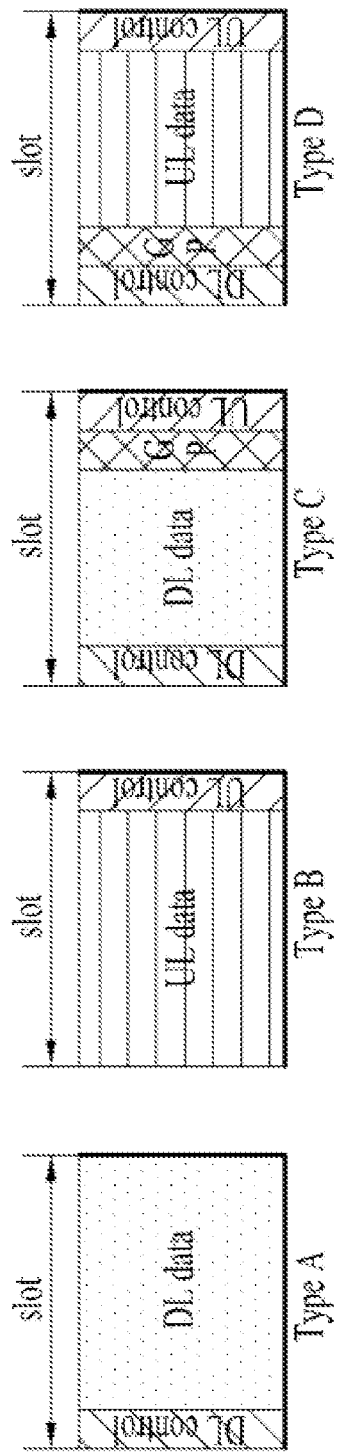

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Method of Preventing Resource Collision in Platooning Environment

Figure 15:
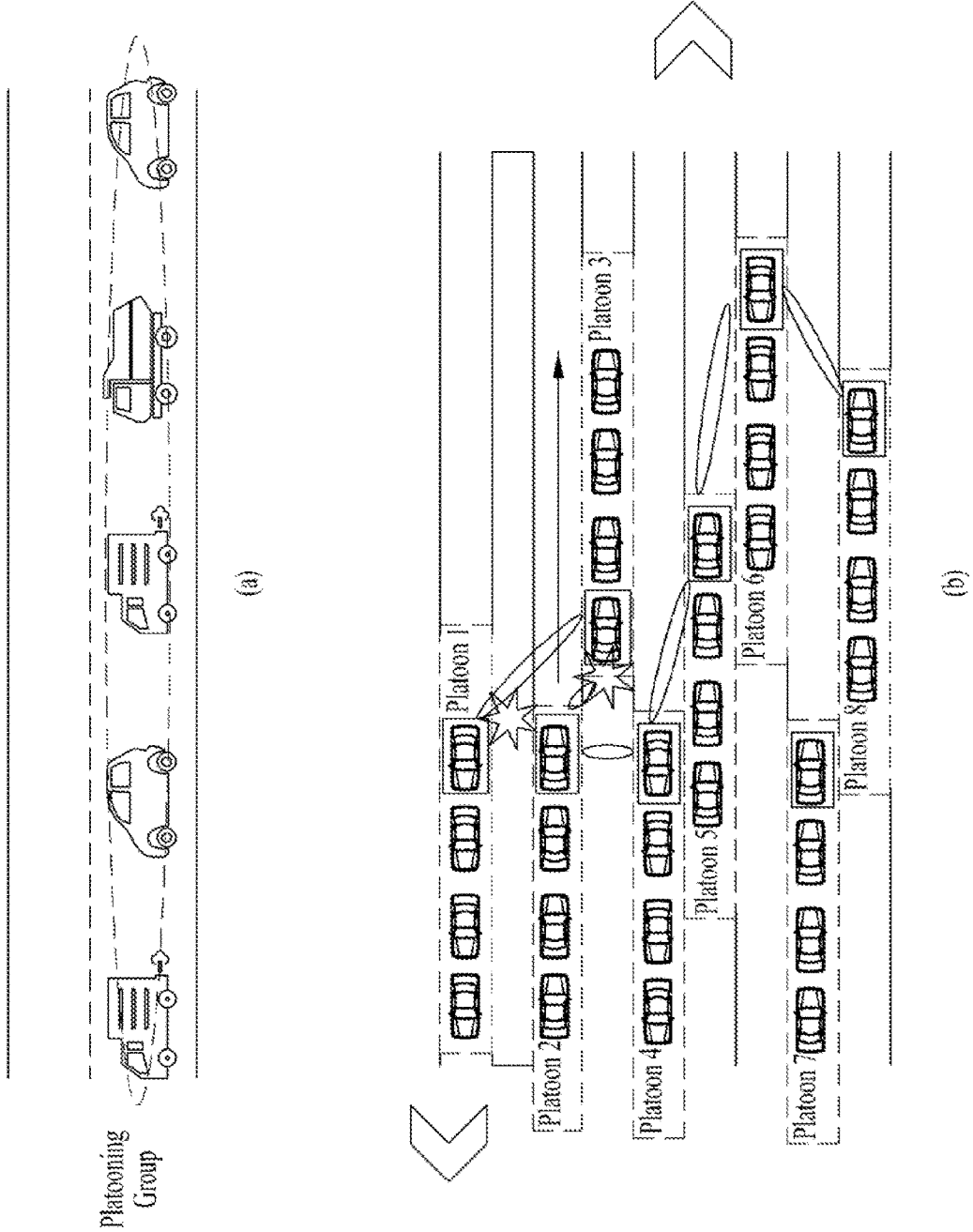
FIG. 15 is a view for explaining a platoon environment depending on driving groups.

FIG. 15 is a view for explaining a platoon environment depending on driving groups.

Referring to FIG. 15(a), a plurality of moving means traveling in the same lane are traveling as one driving group based on a platoon. Herein, the platoon refers to a driving group obtained by grouping moving means (e.g., car, bus, freight car, etc.) that transmit/receive signals to and from each other. The physical distance between the moving means is very close because the driving group move simultaneously and equally. Due to these characteristics, communication between vehicles needs to be highly reliable and also needs to provide very high data throughput. If the above-described communication conditions: high reliability and high data throughput are not satisfied, some UEs belonging to the platoon may not receive transmitted data, and as a result, a fatal accident may occur. Assuming the platoon group needs to change the lane, the platoon group may need to receive group information related to another platoon group formed in a lane different from the lane of the platoon group through data transmission and reception with the other platoon group (or the platoon group may need to provide group information on itself). Such an operation also needs to be highly reliable.

Referring to FIG. 15(b), a plurality of platoon groups (or a plurality of driving groups) are formed for a plurality of driving lanes within a specific area, and one platoon group is formed for each driving lane. In this case, platoon groups 5, 6, 7, and 8 may communicate with each other because there is little influence from their surroundings. However, if platoon groups 2 and 4 have beam alignment for transmission and reception, if platoon groups 2 and 3 have beam alignment, and if platoon group 2 is moving relatively faster than the other platoon groups, the aligned beams may gradually get closer to each other. In this case, the beam formed between the platoon groups 2 and 4 may overlap with the beam formed between the platoon group 3 and 4 at a specific point in time, and interference may occur between the beams. It is apparent that the occurrence of such interference may cause a fatal effect on the platoon driving operation where reliability is important. In addition, if platoon groups 1 and 3 in the opposite lanes perform transmission and reception based on the formed beam, the beam formed between platoon groups 1 and 3 may overlap with the beam formed between platoon groups 2 and 4 due to the traveling direction of platoon group 1, so that interference may occur.

Figure 16:
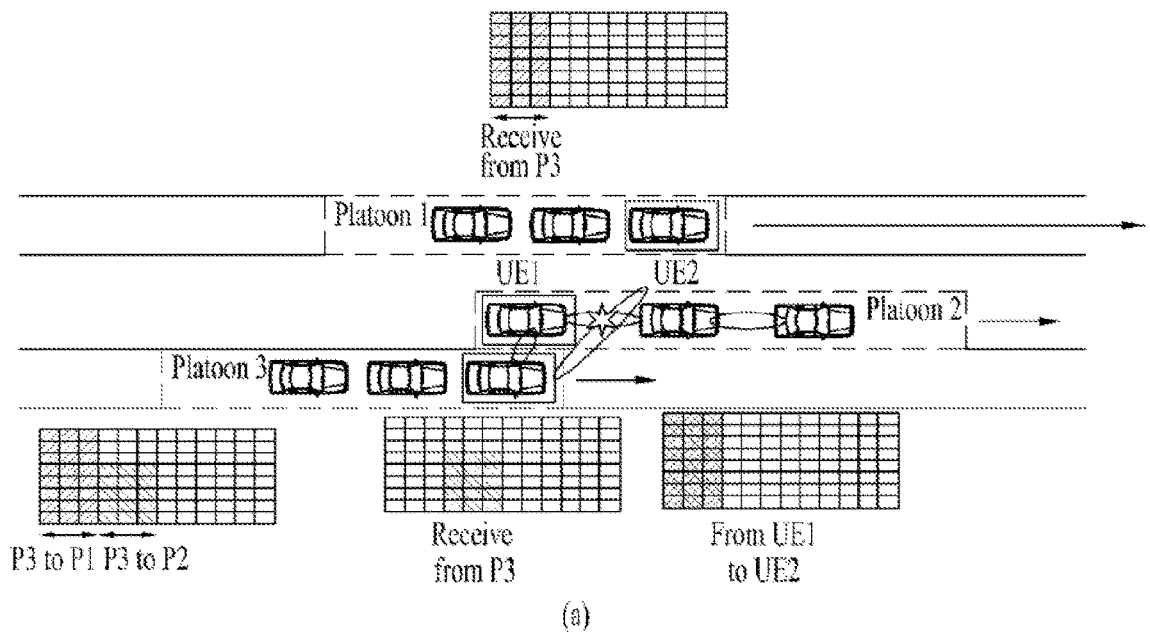
FIG. 16 is a view for explaining the occurrence of interference between driving groups caused by hardware of a vehicle included in a driving group.
Figure 16:
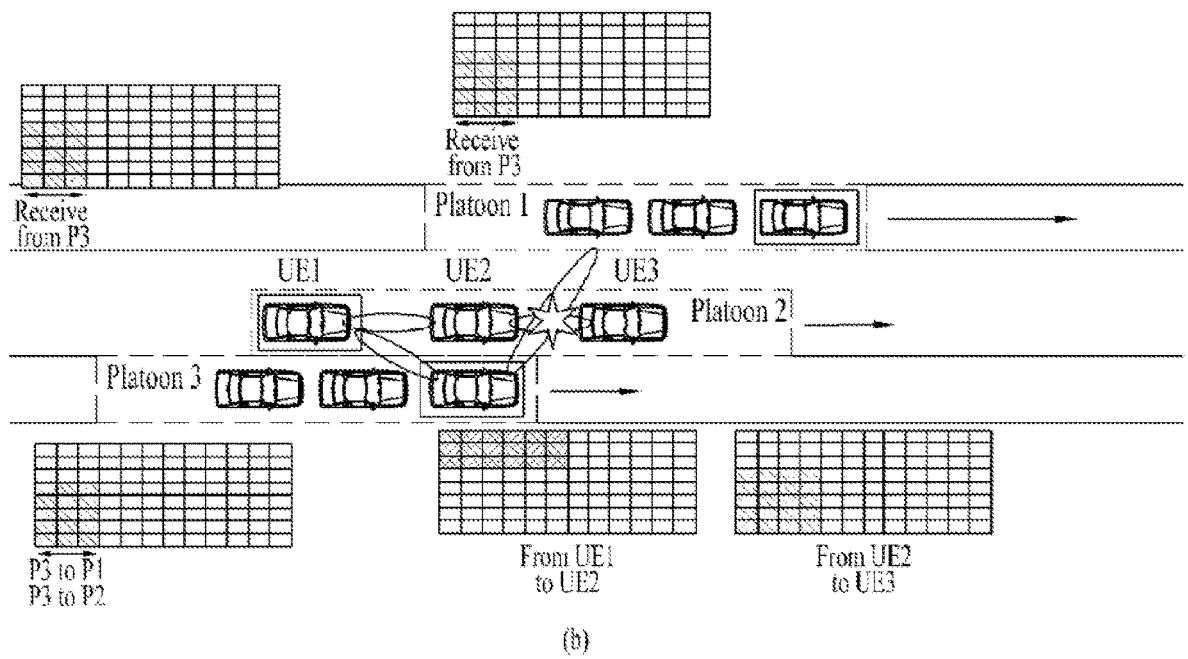

FIG. 16 is a view for explaining the occurrence of interference between driving groups caused by hardware of a vehicle included in a driving group.

Referring to FIGS. 16(a) and 16(b), a plurality of vehicles are grouped into first to third driving groups depending on driving lanes. That is, driving groups are obtained by grouping based on driving lanes as described above. For example, vehicle driving in the same lane may be included in one driving group.

Referring to FIG. 16(a), each vehicle included in a driving group may perform communication based on a UE including a plurality of antenna panels and one modem controlling the plurality of antenna panels. One panel may form one beam at a time to transmit data in the time domain. In this case, as shown in FIG. 16(a), beams of driving groups 1 and 3 may cause interference to beams between UEs in driving group 2. That is, since the same transmission/reception resources are allocated to a beam transmitted from driving group 3 to driving group 1 and a beam transmitted from UE 1 to UE 2, interference may occur between the two beams.

Referring to FIG. 16(b), each vehicle included in a driving group may perform communication based on a UE including a plurality of antenna panels and a plurality of modems controlling the plurality of antenna panels. In this case, the UE may transmit data by forming beams using multiple antenna panels simultaneously in the time domain. The figure below shows possible interference in Case 2. In this case, as shown in FIG. 16(a), if beams are formed and transmitted by multiple antenna panels at the same time, interference may occur between the panels. That is, since the same transmission and reception resources are allocated to a beam transmitted from driving group 3 to driving group 1 and a beam transmitted from UE 1 to UE 2, interference may occur between the two beams.

In transmission and reception based on a platoon group (hereinafter referred to as a driving group), interference may occur between beams regardless of the number of modems or the number of panels as described above with reference to FIGS. 16(a) and 16(b).

Assuming that each driving group is connected to another driving group, it is difficult to obtain the location of each driving group. To obtain the approximate location of each driving group, CAM information or GPS information may be used. However, considering that such information needs to be provided to all driving groups in real time, it may cause a large burden. This is because, if the speed of a vehicle belonging to a driving group is high, an interfering beam may disappear during resource reallocation. In consideration of such a signaling load, a driving group according to an embodiment may periodically unicast information on the driving lane of connected vehicles (or UEs included in the vehicles) to neighboring driving groups.

Each driving group may know lane information on driving groups that is connected to itself. In an embodiment, transmission and reception resources of only a middle driving group in the farthest lane from a transmitting driving group may be allocated or changed. For example, transmission and reception resource of only a second driving group between a first driving group and a third driving group may be reallocated or changed. Hereinafter, a method of operating a driving group where resource reallocation is performed will be described.

The present disclosure proposes a method for solving such an interference problem between beams. Specifically, the present disclosure proposes resource reallocation to reduce interference between driving groups.

In Case of Initial Transmission

For initial transmission, if all PSCCH/PSSCH transmissions have the same priority with respect to PSSCH resource selection (or reselection), all resources may be considered as selectable resources. Next, the UE may exclude specific resource(s) among the selectable resources based on SA decoding and at least one of the following additional conditions. Specifically, the UE included in a specific driving group may select transmission resources related to V2X after excluding at least one specific resource based on SA and specific conditions. When the SA (or control information related to the SA) and data related thereto are transmitted in the same subframe, a resource exclusion method based on DM-RS reception power on a PSSCH may be applied. That is, resources where the reference signal received power (RSRP) of a received PSSCH is greater than or equal to a predetermined threshold may be excluded from resources indicated or reserved by the decoded SA and data resources related to the SA. Here, the PSSCH RSRP may be defined as a linear average of power distributions of resource elements (REs) carrying DM-RSs associated with a PSSCH in physical resource blocks (PRBs) indicated by a PSCCH. The PSSCH RSRP may be measured with respect to the antenna connection of the UE. The SA may include a 3-bit ProSe per-packet priority (PPPP) field. In addition, the predetermined threshold may be given in the form of a function with respect to priority information. For example, the predetermined threshold may be determined depending on priority information on a transport block and priority information on the decoded SA. The threshold may be given in units of 2 dBm in the range of −128 dBm to 0 dBm. In this case, a total of 64 predetermined thresholds may be preconfigured.

The UE may decode the SA in subframe #m+c within a sensing period and assume that the same frequency resource is reserved by the SA in subframe #m+d+P*i. As described above, P may be a fixed value of 100. In addition, i may be selected from the range of 0, 1, . . . , 10, and the value of i may be carrier-specifically configured by the network or predetermined. In this case, i=0 means that there is no intention to reserve a frequency resource. Further, i may be configured by a 10-bit bitmap or a 4-bit field in the SA. In a period of P*I, if semi-static candidate resource X collides with resource Y reserved by SA of another UE and the exclusion conditions are satisfied, the UE may exclude semi-static candidate resource X, where I denotes the value of i signaled by the SA.

In addition, the transmitting UE may also exclude resources occupied by vehicles traveling in the same direction with respect to the driving lane. Alternatively, the priorities of resource may also be considered to allocate each resource. In this case, the transmitting UE may exclude a resource occupancy period from the selectable resources based on the priorities.

After the specific resources satisfying the specific conditions are excluded by the SA decoding, a sensing process, etc., the remaining resources may be less than 20% of the total resources within the selection window. In this case, the transmitting UE may increase the predetermined threshold (for example, by 3 dB) and then perform the operation of excluding resources based on the increased predetermined threshold again. Such a process may be performed until the remaining resources become more than 20% of the total resources within the selection window. Here, the total resources within the selection window mean selectable candidate resources that the UE need to consider. On the other hand, if the counter reaches a value of 0 while the UE selects the V2X transmission resources after excluding the specific resources satisfying the specific conditions, the UE may maintain the current resources with a probability of p and reset the counter. That is, the UE may reselect the resources with a probability of 1−p. In this case, the carrier-specific parameter p may be preconfigured, which may be set in the range of 0, 0.2, 0.4, 0.6, and 0.8.

Next, the UE may measure the received energy for the remaining candidate resources (or PSSCH resources) except for the specific resources satisfying the specific conditions. After ranking the remaining candidate resources based on the measured total received energy, the UE may select a specific subset. Here, the specific subset may be a set of candidate resources having the lowest received energy. The size of the subset may be 20% of the total resources within the selection window. Thereafter, the UE may randomly select at least one transmission resource from the subset.

If only one transport block is transmitted in one subframe, the UE may select M consecutive subchannels, the average of energy measured in each subchannel may be energy measured for each resource. Meanwhile, when at least one transport (or transmission) block (TB) is transmitted in two subframes, the resource selection may be performed as follows.

First, one resource in which a mechanism defined for a TB transmitted in one subframe is used may be selected. Thereafter, another resource may be randomly selected under the following conditions. The selected resource should not be in the same subframe as the first selected resource and also should not be in subframes excluded from the resource selection. In addition, SCI may indicate a time gap between the two selected resources. When there is no resource that satisfies the second resource selection condition, the TB may be transmitted on only the first resource.

Case in which Resources are Already Allocated

Figure 17:
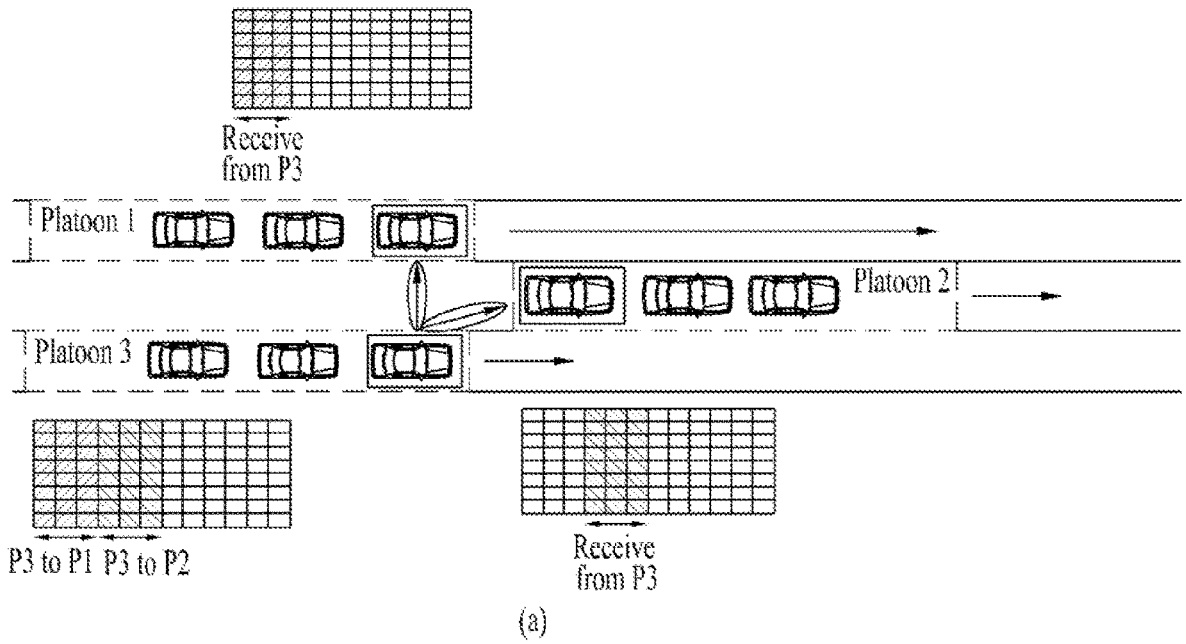
FIGS. 17 and 18 are views for explaining a method of performing reallocation of transmission resources based on transmission and reception resources between driving groups.
Figure 17:
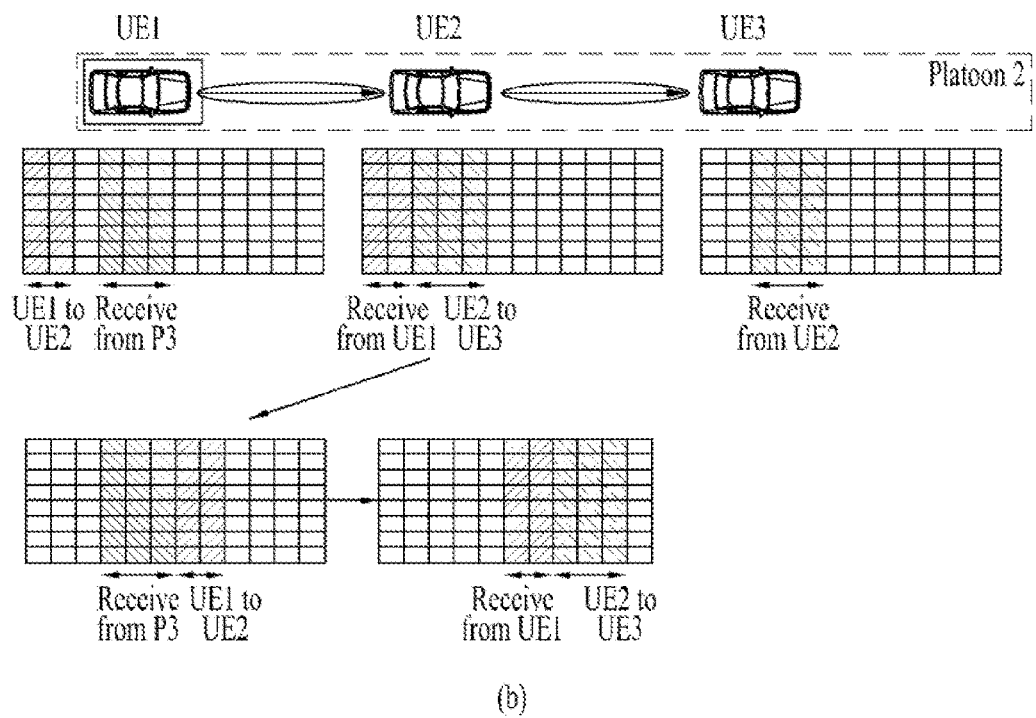
Figure 18:
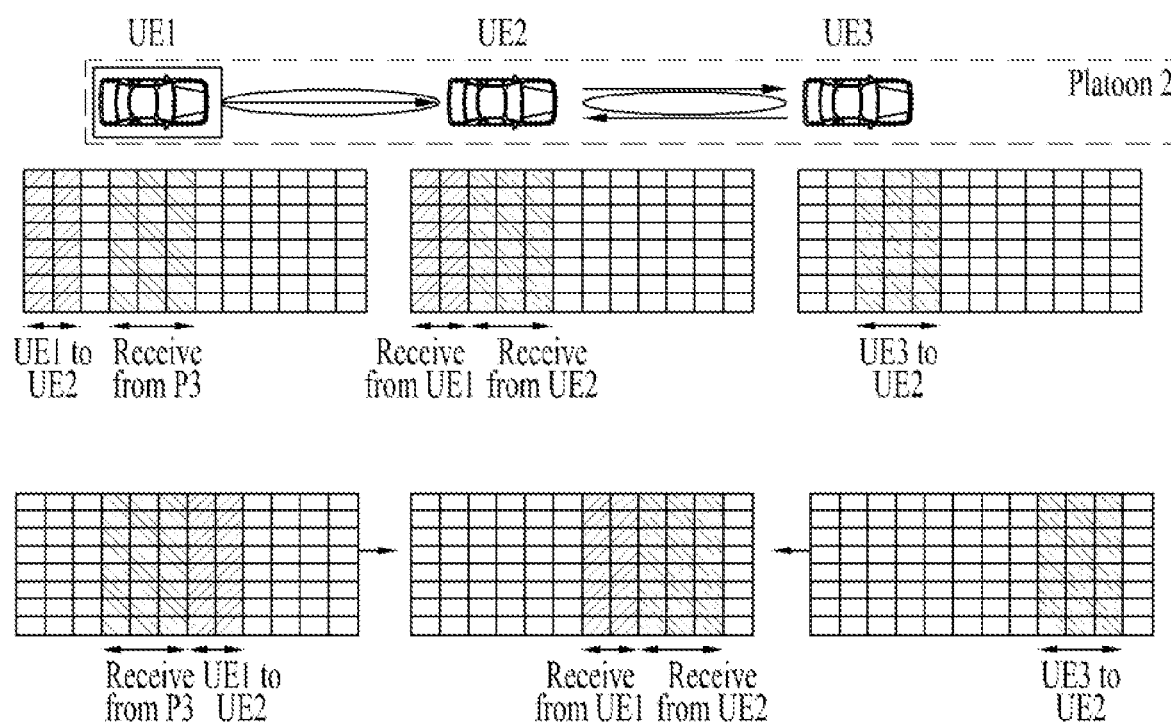

FIGS. 17 and 18 are views for explaining a method of performing transmission resource reallocation based on transmission and reception resources between driving groups.

Referring to FIG. 17, a plurality of vehicles (or UEs included in the plurality of vehicles) are grouped into a first driving group to a third driving group based on driving lanes. In addition, transmission and reception resources between driving groups and transmission and reception resources between vehicles or UEs in one driving group are already allocated.

Referring to FIG. 17(a), the third driving group transmits data to the first driving group and the second driving group. Before transmitting data, the third driving group transmits information on resources used for transmission and reception with another driving group to the other driving group. For example, the third driving group may transmit a signal in a resource region allocated for the first driving group and perform new transmission to the second driving group. In this case, the third driving group may transmit group information including information on a second resource region including information on a resource region to be transmitted to the second driving group and information on a resource region related to signal transmission and reception with the first driving group. Alternatively, the UE may transmit the group information including the information on the second resource region and information on the driving lane to UEs included in the second driving group.

Referring to FIG. 17(b), upon receiving the information on the second resource region from the third driving group, a UE included in the second driving group may check whether a first resource region for transmitting a signal to another UE in the second driving group overlaps with the second resource region. When the first resource region and the second resource region overlap with each other, the UE may reallocate a resource region that does not overlap with the second resource region and transmit information on the reallocated resource region and the information on the second resource region together to the other UE. The above-described operation may also be performed by other UEs included in the second driving group. In this case, communication between UEs in the second driving group may be performed only in the remaining resource regions except for the second resource region in which interference may occur. In other words, the UEs in the second driving group may be configured not to use a resource region for transmission and reception between driving groups, thereby preventing interference to the transmission and reception between driving groups.

Referring to FIG. 18, when UE 1 transmits a signal to UE 2 and UE 3 transmits a signal to UE 2, if UE 1 receives group information including second resource region information or driving lane information from a third driving group, UE 1 may perform resource allocation for UE 1 and UE 2. However, since UE 2 only receives a signal from UE 3, it may be difficult for UE 1 and UE 2 to provide information indicating reallocation of a transmission resource region for UE 3 or information related to reallocation directly to UE 3. In this case, UE 1 may transmit the resource region reallocation information and the group information to UE 2 and, at the same time, provide the group information and the resource region reallocation information to UE 3 over a channel for transmitting an ACK/NACK for a signal received from UE 3. UE 3 may reallocate the transmission resource region for UE 3 based on the group information and the resource region reallocation information, which is received over the channel for transmitting an ACK/NACK. Alternatively, if UE 1 receives a signal only from another UE in the same driving group, UE 1 may directly transmit the group information and the resource region reallocation information over an ACK/NACK channel related to a signal received from the other UE as in the above-described method. Alternatively, instead of transmitting the group information over the aforementioned ACK/NACK channel, UE 2 may instruct resource reallocation for reception rather than resource allocation for transmission at UE 3 over a separate PSCCH (or a PSCCH including the group information)

Alternatively, even when UE 1 does not need to change its own transmission resource region, UE 1 may transmit the group information and/or information on its own resource region to other UEs included in the same driving group in order to change the transmission resource regions of the other UEs. Even in this case, if UE 1 only receives signals from other UEs in the same driving group, UE 1 may directly transmit the group information and the resource region reallocation information over an ACK/NACK channel related to a signal received from the other UE as in the above-described method.

On the other hand, when a UE included in the second driving group is incapable of allocating new resources that does not overlap with the second resource region, the UE may reallocate resources in a resource region that minimally overlaps with the second resource region. In this case, the UE needs to transmit/receive data by accepting some degree of interference.

Figure 19:
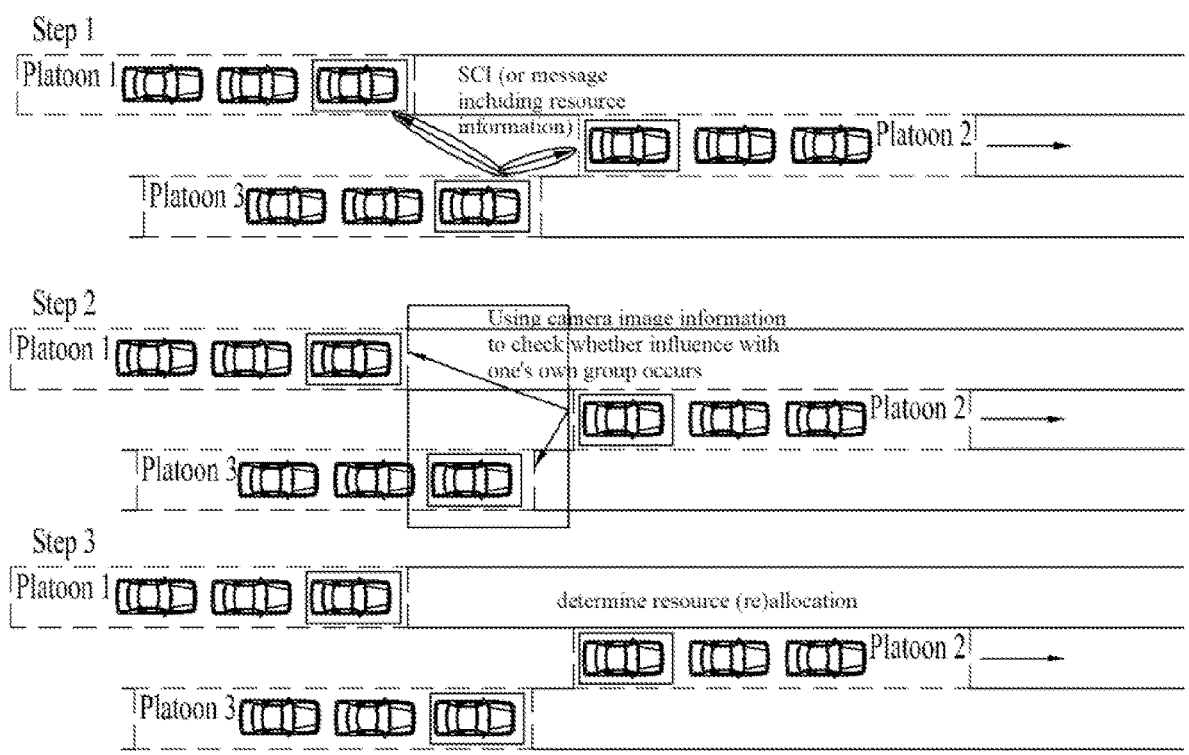
Figure 20:
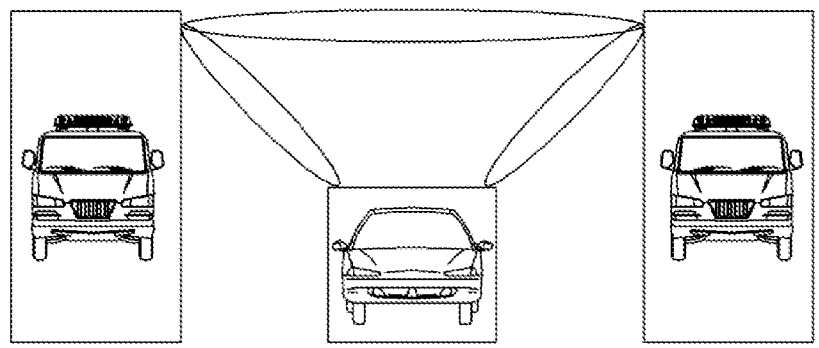
Figure 20:
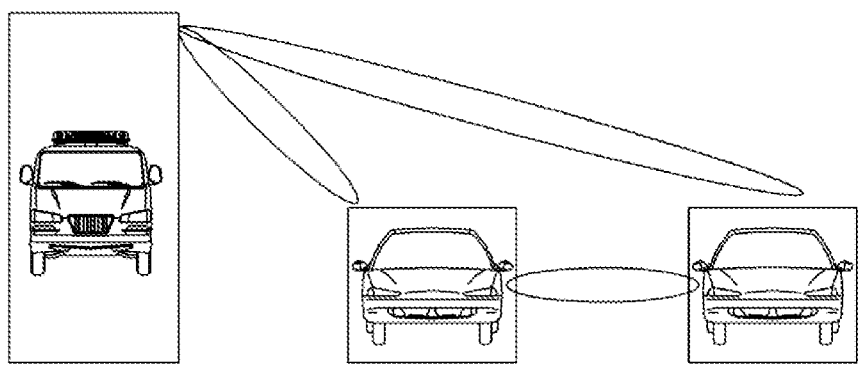
Figure 20:
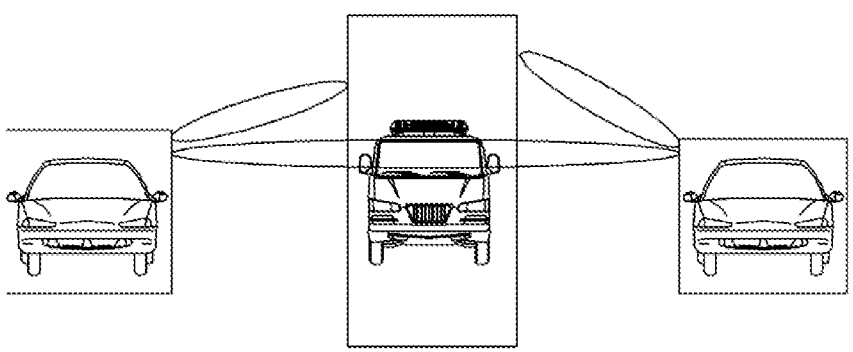

FIGS. 19 and 20 are views for explaining a method in which a UE belonging to a driving group performs resource reallocation based on information acquired by a sensor or the like.

Referring to FIG. 19, a first UE belonging to a second driving group may obtain information on driving groups located in adjacent lanes from a sensor. Specifically, the first UE may obtain information on the type of vehicle located in an adjacent lane, the height of the vehicle, the distance to the vehicle, and the relative speed with the vehicle based on a device such as an imaging device, a radar, or a lidar.

Alternatively, the first UE may obtain SCI in advance from a first driving group and a third driving group. Specifically, a driving group located in a lane that may be affected by interference may receive SCI from an adjacent driving group that may cause the interference. In this case, a UE belonging to the driving group affected by the interference may acquire a time for which the adjacent driving group occupies a specific resource or a specific resource region based on a parameter included in the SCI. For example, when resources are allocated based on semi-persistent scheduling (SPS), the UE may know a reserved transmission period (T2, where 20 ms<T2<100 ms) related to reserved resources based on the SCI. In this case, the UE belonging to the driving group affected by the interference may determine whether the UE may be affected by the interference caused by the adjacent driving group from its own sensor (for example, the UE may be a UE belonging to the second driving group located between the first driving group and the second driving group as shown in FIG. 19). Specifically, the UE may estimate whether the UE may be affected by the interference within the reserved transmission (Tx) period obtained from the parameter included in the SCI, based on distances and speeds calculated for other UEs belonging to the adjacent driving group with respect to itself. When it is estimated that the UE is not affected by the interference from the adjacent driving group within the reserved transmission period, the UE may not perform resource reallocation based on transmission and reception resources between driving groups.

Alternatively, the UE may determine a specific timing at which the resource reallocation is to be performed based on the distances and speeds calculated for the other UE. For example, when it is expected that the UE is affected by interference at a predetermined timing based on the distances and speeds for the other UEs belonging to the adjacent driving group, the UE may determine a timing to perform the resource reallocation based on the predetermined timing.

Alternatively, the UE may calculate the distances and speeds for the other UEs belonging to the adjacent driving group with respect to a specific UE located at the rearmost end among UEs belonging to the same driving group rather than itself. Based on the calculated distances and speeds, the UE may determine whether to transmit information related to resource reallocation to the specific UE or provide information on a timing at which the resource reallocation is required.

In addition, since conventional LTE-based V2X communication has omnidirectional coverage, it is possible to know information on transmission and reception between UEs within the coverage from RSRP and RSSI. Since a beam has strong straightness and directionality in millimeter wave (mmWave) communication, it is impossible to know information on transmission and reception between neighboring UEs from RSRP and RSSI. Therefore, further considering the beam straightness in the mm Wave communication, whether resource reallocation or initial allocation is performed may be determined in consideration of transmission and reception resources of a driving group. In other words, if transmission and reception between driving groups are not affected, a resource area or a resource pool that may affect the transmission and reception between driving groups may not be excluded in the resource reallocation or initial allocation. For example, the height of a beam formed between driving groups may be determined according to the type of vehicle (truck, bus, passenger car, etc.). That is, a UE included in a driving group sandwiched in the middle of both lanes may estimate or obtain the height of a beam formed by UEs participating in transmission and reception between driving groups based on the type of vehicle in which the UE is included. In addition, the UE may determine whether to perform the resource reallocation operation based on the height and straightness of the beam.

FIG. 20(*a*) shows UEs performing transmission and reception between driving groups. The vehicle located in the middle lane may be a passenger car, and the vehicles located at both sides of the passenger vehicle may be trucks. In this case, since the height of a beam formed between the two trucks performing communication between driving groups is higher than the height of the passenger car, a UE included in the passenger car is less likely to receive interference from the communication between the driving groups. Accordingly, even if the UE included in the passenger car is located between the trucks and performs signal transmission on a transmission resource overlapping with a transmission and reception resource region between the adjacent driving groups, the UE may not need to reallocate its own transmission resource.

Referring to FIG. 20(*b*), a UE of a truck belonging to a first driving group transmits and receives signals to and from a UE of a passenger car belonging to a second driving group and a UE of a passenger car belonging to a third driving group. The UE of the passenger car belonging to the second driving group may anticipate that the height of a beam formed between the first driving group and the third driving group will not cause interference to its signal transmission and reception, based on vehicle type information through the center or vehicle type information acquired in advance. In this case, even if the conditions for performing the resource reallocation operation described above with reference to FIG. 17 or 18 are satisfied, the UE of the passenger car may not perform the resource reallocation operation by additionally considering the height of a beam formed between the first driving group and the second driving group.

Referring to FIG. 20 (*c*), when passenger cars are located in both side lanes and a truck is in the middle lane, communication between the passenger cars may not be performed. Such a situation may be detected by the truck based on vehicle type information acquired or measured. When the situation is detected, an operation of relaying a signal between adjacent driving groups may be performed instead of the resource reallocation operation.

Alternatively, the resource reallocation may not be performed based on image information in dedicated short-range communications (DSRC) even when there is no influence of interference.

According to the embodiments described above with reference to FIGS. 15 to 20, resources may be reallocated to avoid a section or resource region where interference may occur due to signal transmission between driving groups, thereby preventing or minimizing the interference caused by the signal transmission between the driving groups. The above resource reallocation operation may provide reliable communication environments in data transmission and reception between the driving groups. In addition, the resource reallocation operation may minimize interference that may affect a driving group in the middle due to signal transmission and reception between other driving groups, thereby improving the reliability of communication between UEs in driving groups.

Communication System and Communication Device

The various details, functions, procedures, proposals, methods, and/or operational flowcharts described in this document may be applied to a variety of fields that require wireless communication/connections (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

Figure 21:
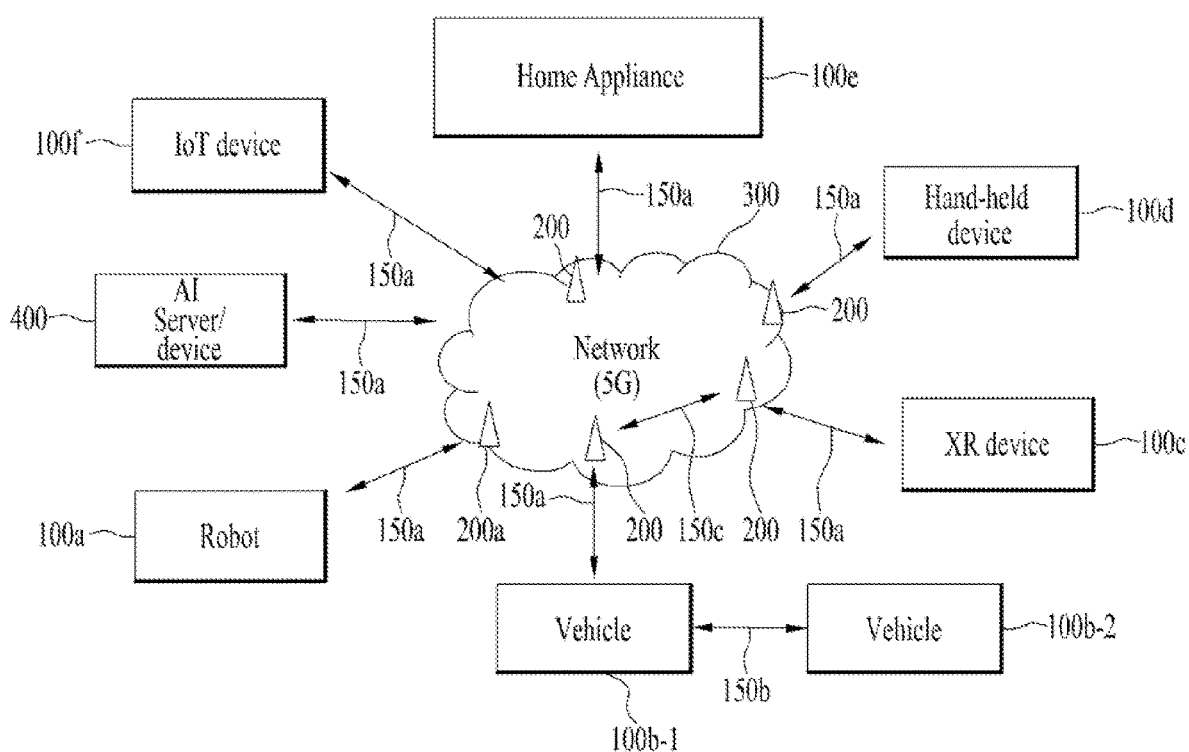
FIG. 21 illustrates a communication system applied to the present disclosure.

FIG. 21 illustrates a communication system applied to the present disclosure.

Referring to FIG. 21, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 22:
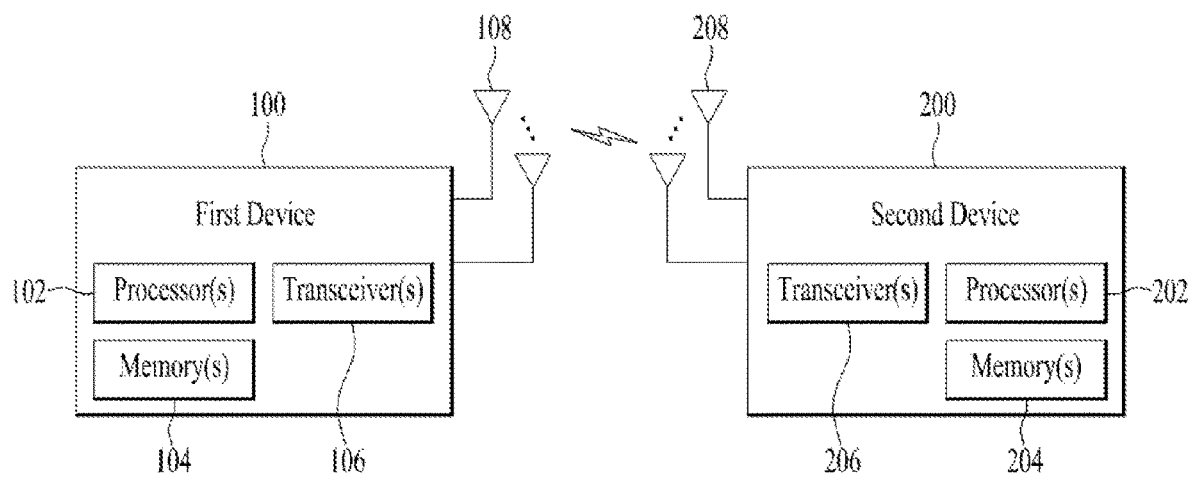
FIG. 22 illustrates wireless devices applicable to the present disclosure.

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 23:
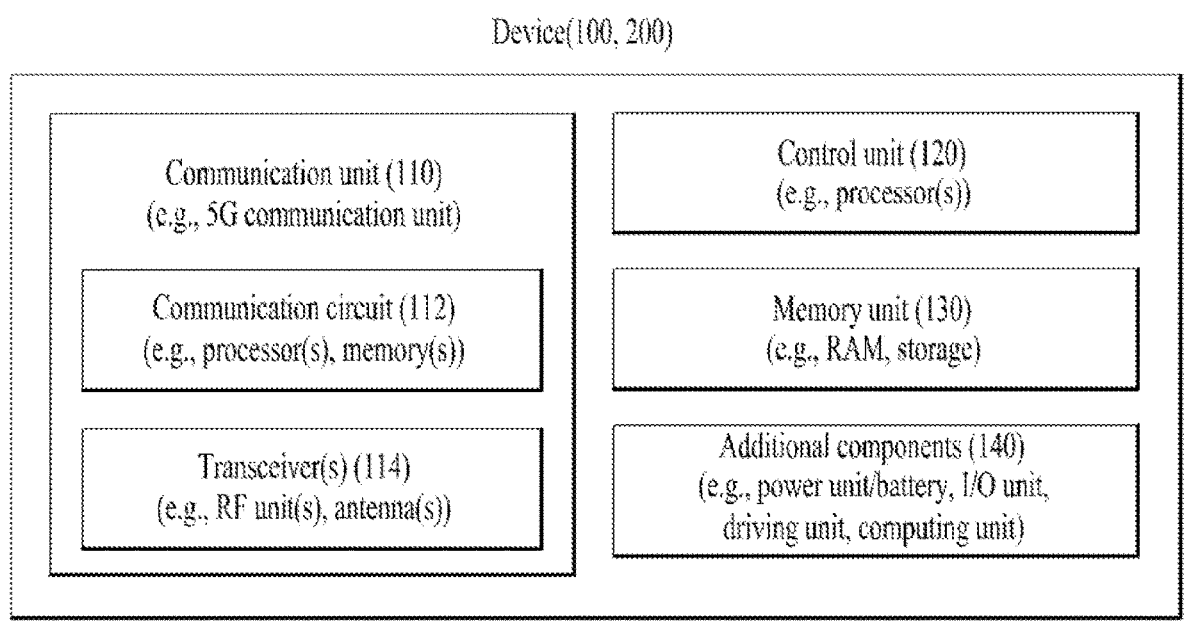
FIG. 23 illustrates another example of a wireless device applied to the present disclosure.

FIG. 23 illustrates another example of a wireless device applied to the present disclosure. The wireless device may be implemented in various forms according to a use-case/service (refer to FIG. 21).

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor an application processor an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 24:
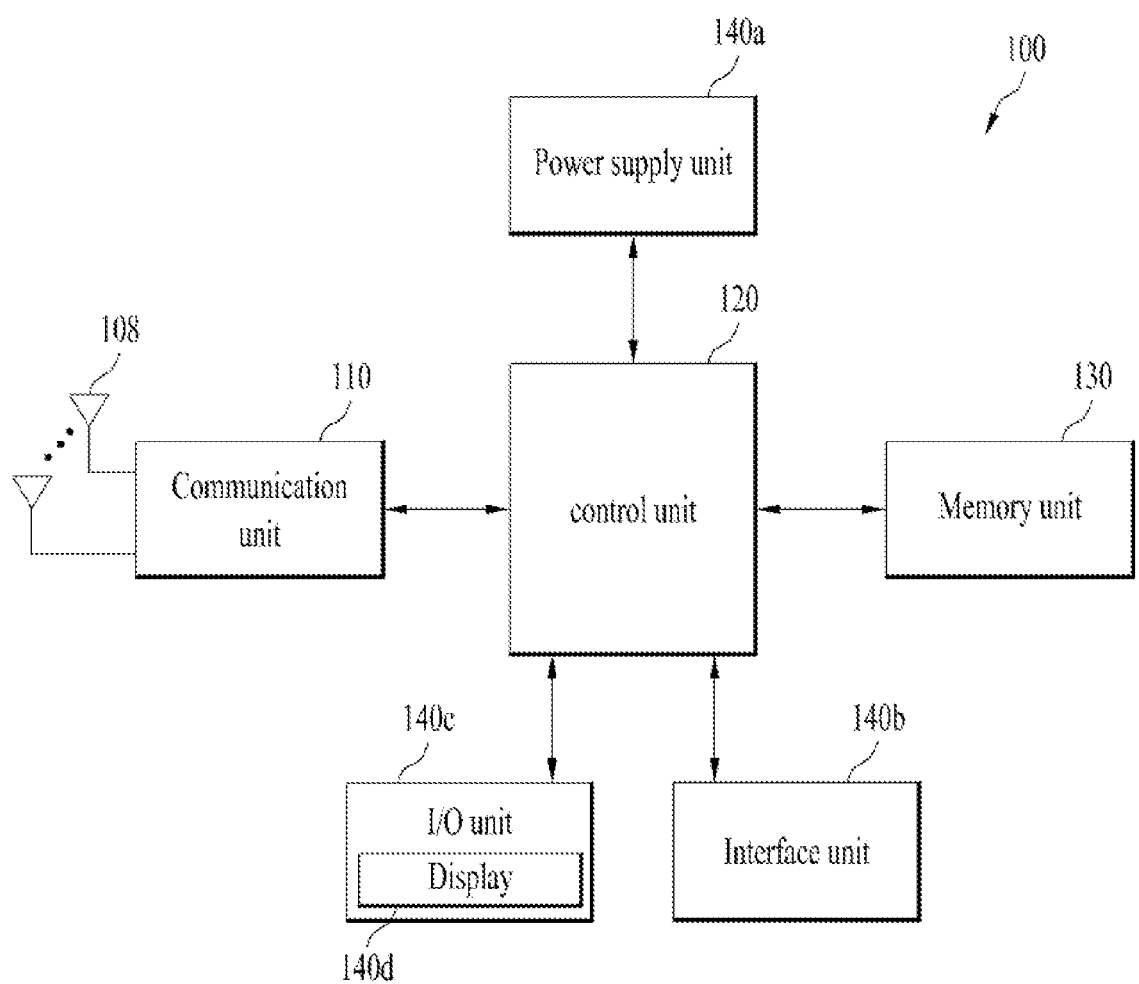
FIG. 24 illustrates a hand-held device applied to the present disclosure.

Hereinafter, an example of implementing FIG. 23 will be described in detail with reference to the drawings
Examples of Mobile Devices to which the Present Disclosure is Applied FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
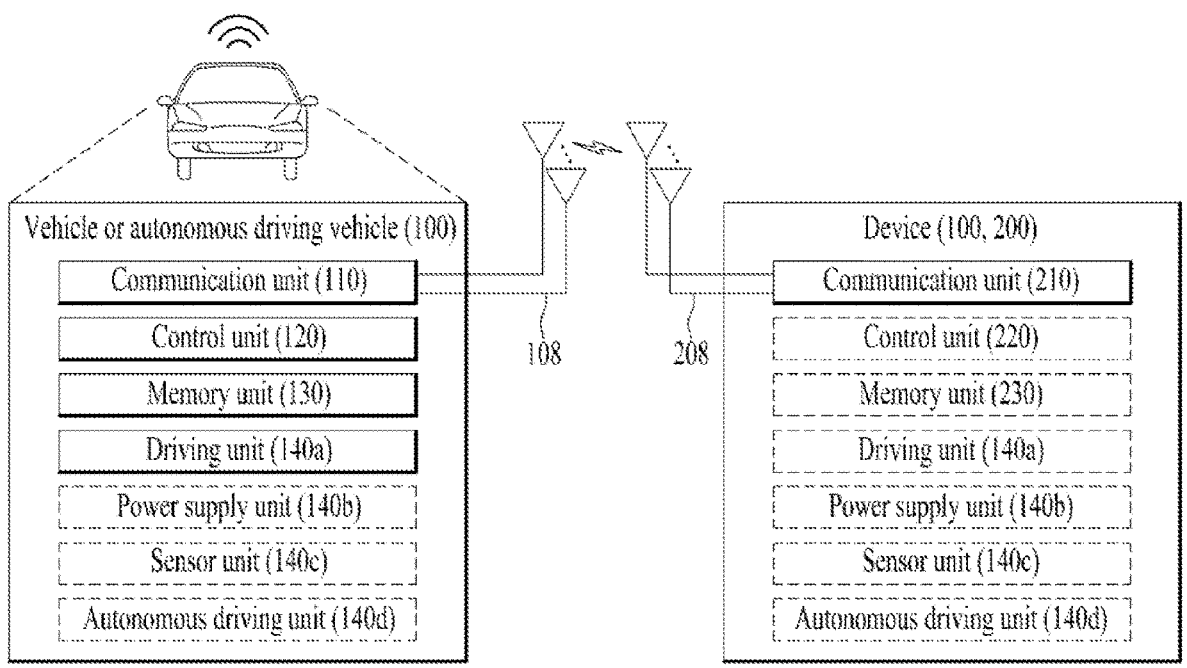
FIG. 25 illustrates a vehicle or an autonomous driving vehicle applied to the present disclosure.

Examples of Vehicles or Autonomous Vehicles to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor a collision sensor a wheel sensor a speed sensor a slope sensor a weight sensor a heading sensor a position module, a vehicle forward/backward sensor a battery sensor a fuel sensor a tire sensor a steering sensor a temperature sensor a humidity sensor an ultrasonic sensor an illumination sensor a pedal position sensor etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with the following terms: user equipment (UE), mobile station (MS), and mobile subscriber station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described above, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method of reallocating, by a first user equipment (UE), second resources for transmission of a PSSCH (physical sidelink shared channel) in a wireless communication system supporting sidelink, the method comprising:
  receiving configuration information on a resource pool;
  selecting first resources in the resource pool;
  obtaining first reserved resources from a second PSCCH (physical sidelink control channel) of a neighboring UE;
  excluding a specific resource overlapping the reserved resource from the first resources based on a reception strength of the second PSCCH and the first reserved resources;
  transmitting a first PSCCH allocating second resources from which the specific resource is excluded from the first resource;
  obtaining information on second reserved resources from a third PSCCH of the neighboring UE after transmitting the first PSCCH; and
  determining whether to reallocate the second resources based on the third PSCCH,
  wherein the third PSCCH includes (i) second group information on a second driving group driving in a lane different from the first driving group including the first UE and (ii) information on the second reserved resources for a transmission and reception of a signal between the second driving group and a third driving group, and
  wherein whether to reallocate the second resources is determined based on the second group information and the second reserved resources.

2. The method of claim 1, further comprising:
  transmitting first group information for the first driving group to other UE through an acknowledgment/negative acknowledgment (ACK/NACK) related to a sidelink signal received from the other UE in the first driving group.

3. The method of claim 1, wherein whether to reallocate the second resources is determined based on a positional relationship between the second driving group and the third driving group and based on whether the second resources overlaps with the second reserved resources.

4. The method of claim 1, wherein the second group information further comprises information on a resource region for the second driving group to transmit and receive a signal to and from the first driving group.

5. The method of claim 1, wherein resource reallocation of the second resources is triggered only based on that the lane of the first driving group is located between the lane of the second driving group and the lane of the third driving group.

6. The method of claim 1, wherein the first UE is configured to determine a time to perform reallocation of the second resources based on information on speeds and distances of the second driving group and the third driving group obtained from a sensor.

7. The method of claim 1, wherein the first UE is configured to obtain type information on vehicles driving in adjacent lanes from a sensor.

8. The method of claim 7, wherein a height of a beam formed between the second driving group and the third driving group is estimated based on the type information.

9. The method of claim 8, wherein the estimated beam height and a height of a vehicle including the first UE are additionally considered to determine whether to reallocate the second resources.

10. The method of claim 8, wherein the first UE is configured to determine whether to relay a signal between the second driving group and the third driving group based on the estimated beam height and the height of the vehicle including the first UE.

11. A first user equipment (UE) configured to reallocate second resources for transmission of a PSSCH (physical sidelink shared channel) in a wireless communication system supporting sidelink, the first UE comprising:
   a radio frequency (RF) transceiver; and
   a processor connected to the RF transceiver,
   wherein the processor is configured to:
      control the RF transceiver to receive configuration information on a resource pool, select first resources in the resource pool, control the RF transceiver to obtain first reserved resources from a second PSCCH (physical sidelink control channel) of a neighboring UE, exclude a specific resource overlapping the reserved resource from the first resources based on a reception strength of the second PSCCH and the first reserved resources, control the RF transceiver to transmit a first PSCCH allocating second resources from which the specific resource is excluded from the first resource, obtain information on second reserved resources from a third PSCCH of the neighboring UE after transmitting the first PSCCH, and determine whether to reallocate the second resources based on the third PSCCH,
   wherein the third PSCCH includes (i) second group information on a second driving group driving in a lane different from the first driving group including the first UE and (ii) information on the second reserved resources for a transmission and reception of a signal between the second driving group and a third driving group, and
   wherein whether to reallocate the second resources is determined based on the second group information and the second reserved resources.

12. The first UE of claim 11, wherein the processor is additionally transmitted first group information for the first driving group to other UE through an acknowledgment/negative acknowledgment (ACK/NACK) channel related to a sidelink signal received from the other UE in the first driving group.

13. The first UE of claim 11, wherein whether to reallocate the second resources is determined based on a positional relationship between the second driving group and the third driving group and based on whether the second resources overlaps with the second reserved resources.

14. The first UE of claim 11, wherein the second group information further comprises information on a resource region for the second driving group to transmit and receive a signal to and from the first driving group.

* * * * *